United States Patent [19]
Weir et al.

[11] 3,716,618
[45] Feb. 13, 1973

[54] SEPARATION OF COBALT FROM NICKEL AND COBALT BEARING AMMONIACAL SOLUTIONS

[75] Inventors: Donald Robert Weir; Russell Peter Kofluk, both of Fort Saskatchewan, Alberta, Canada

[73] Assignee: Sherritt Gordon Mines Limited, Toronto, Ontario, Canada

[22] Filed: March 24, 1971

[21] Appl. No.: 127,677

[52] U.S. Cl. .................. 423/143, 423/140, 75/103, 75/119
[51] Int. Cl. ........................ C01g 51/00, C01g 53/00
[58] Field of Search ...75/103, 119; 23/134; 423/143, 423/140

[56] References Cited

UNITED STATES PATENTS

| 2,693,404 | 11/1954 | Mackin | 75/119 X |
| 2,013,334 | 11/1959 | Dean | 75/119 X |

FOREIGN PATENTS OR APPLICATIONS

| 811,078 | 4/1969 | Canada | 75/119 |
| 717,474 | 9/1965 | Canada | 75/119 |

Primary Examiner—Herbert T. Carter
Attorney—Frank I. Piper, Arne I. Fors and James T. Wilbur

[57] ABSTRACT

A process for extracting a nickel product having a predetermined nickel to cobalt ratio and a mixed nickel-cobalt sulphide product having a low nickel to cobalt ratio from reduced nickel and cobalt bearing lateritic and garnieritic ores. The reduced ores are leached in one or more stages under oxidizing conditions in an aqueous ammoniacal ammonium carbonate solution. Solution from the leaching operation is treated in a multi-stage cobalt removal operation in which excess sulphidizing agent is added to one stage to effect extraction of a large quantity of cobalt from solution as a mixed nickel-cobalt sulphide precipitate. The amount of sulphidizing agent added to another stage is restricted to produce a mixed nickel-cobalt sulphide precipitate with a low Ni:Co weight ratio. The mixed sulphide precipitate is removed from each stage solution and a portion is recycled to the solution from which it was removed.

7 Claims, 3 Drawing Figures

SEPARATION OF COBALT FROM NICKEL AND COBALT BEARING AMMONIACAL SOLUTIONS

This invention relates to the separation of nickel and cobalt from solutions derived from leaching nickel and cobalt bearing material, such as reduction roasted laterite ore, in ammoniacal ammonium salt solutions. More particularly, the invention is directed to a process for treating such solutions to retain a maximum amount of the nickel content in the solution while separating a maximum amount of the cobalt as a mixed nickel-cobalt sulphide precipitate containing a minimum amount of nickel.

It is known that nickel and cobalt values can be extracted from various nickel and cobalt bearing materials by hydrometallurgical methods, such as by leaching with ammoniacal ammonium carbonate or ammonium sulphate solutions, It is also known that cobalt and copper can be precipitated from an ammoniacal ammonium salt solution which contains dissolved salts of nickel, cobalt and copper by reacting the solution with a sulphidizing agent which combines first with the dissolved copper values, then the cobalt values and converts them to insoluble copper and cobalt sulphides which precipitate from the solution. Sulphidizing agents which have been found particularly suitable for this purpose include $H_2S$, $(NH_4)_2S$, $Na_2S$ and NaHS.

A sulphidizing agent is only partially successful to preferentially precipitate cobalt from an ammoniacal ammonium salt solution containing dissolved nickel and cobalt values. A significant proportion of the dissolved cobalt values remains in solution and either contaminates the product nickel subsequently recovered from the solution or becomes lost. Moreover where the nickel to cobalt ratio in solution is relatively high e.g., 2:1 or more, the sulphidizing agent causes nickel to precipitate in an amount approximately equal to or greater than the amount of precipitated cobalt. The nickel precipitated with the cobalt represents an appreciable loss since the value of nickel in a mixed nickel-cobalt sulphide precipitate is much less than the value of product nickel recovered from the solution.

The cobalt content of the solution can be decreased to a very low level by adding sulphidizing agent in large excess over the theoretical amount necessary to precipitate all cobalt. However the sulphidizing agent causes a large proportion of the nickel in solution to co-precipitate with the cobalt in the form of a mixed nickel-cobalt sulphide. Where sufficient sulphidizing agent is added to the solution to produce a valuable solution containing dissolved nickel but little dissolved cobalt, the proportion of nickel recovered from the feed ore reporting in the solution is much smaller than the proportion of nickel reporting in the mixed nickel-cobalt sulphide. For example, where it is desired to recover nickel from a solution derived from a reduced lateritic and garnieritic ore and sulphidizing agent is added in amount sufficient to increase the nickel to cobalt ratio to 500:1, the lowest desirable ratio for most practical applications, the nickel to cobalt ratio of the mixed sulphides will be relatively high, generally considerably above 4:1.

The present invention contemplates a process for obtaining a solution having a high nickel to cobalt ratio, generally 700:1 or higher while maintaining the ratio of nickel to cobalt in the mixed cobalt-nickel sulphide precipitate at a low value, generally 2:1 or considerably lower. Where the starting solution contains in addition to nickel and cobalt, copper values, the invention also contemplates a solution which is substantially free of copper and a mixed sulphide precipitate containing substantially all copper values.

Briefly stated, the process which meets these objectives involves a multi-stage cobalt removal procedure in which one stage is controlled to effect removal of a required amount of cobalt from solution to produce a product liquor having a predetermined dissolved nickel to cobalt ratio. The conditions can be adjusted to achieve a product liquor having a predetermined nickel to cobalt ratio generally 700:1 or higher, or where a product liquor having such a high nickel to cobalt ratio is not required e.g., where the solution is subjected to hydrogen reduction for extraction of nickel values, the conditions may be adjusted to achieve a liquor having a Ni:Co ratio less than 700:1. The conditions in another cobalt removal stage are controlled to produce a mixed nickel-cobalt sulphide precipitate of predetermined nickel-cobalt weight ratio. Usually the conditions are adjusted to achieve a nickel to cobalt ratio in the precipitate of less than 2:1. The solution from the first-mentioned cobalt removal stage having a high nickel to cobalt ratio is recovered as product liquor for subsequent treatment for recovery of nickel and the low nickel-cobalt ratio mixed sulphide precipitate from the second-mentioned cobalt removal stage is recovered as product mixed sulphide precipitate. The mixed sulphide precipitate having a high nickel-cobalt ratio from the first-mentioned cobalt removal stage is recycled partly to the first-mentioned cobalt removal stage and the un-recycled portion is fed to the second-mentioned cobalt removal stage. The solution from the second-mentioned cobalt removal stage is recycled to the leaching operation from whence the nickel and cobalt bearing ammoniacal ammonium salt solution is derived. The effect of the foregoing procedure is that only the desired solution of predetermined nickel-cobalt ratio and the mixed sulphide precipitate of predetermined nickel-cobalt ratio are recovered while the solution from which the product precipitate is recovered and the precipitate removed from the product solution are re-circulated within the system. Thus the conditions in the cobalt removal stages can be controlled to achieve a solution and precipitate of any given nickel to cobalt ratio. If the starting solution also contains dissolved copper values substantially all of these values are precipitated by the sulphidizing agent and report with the mixed sulphide precipitate.

The recycled mixed sulphides serve to reduce dissolved cobalt to a cobaltous state in which form it is selectively precipitated with consumption of less sulphidizing agent. The cobalt content of the solution can be decreased to an extremely low level in the first-mentioned cobalt removal stage by careful control of the quantity of sulphidizing agent added to solution to produce liquor having a nickel to cobalt ratio of a required value. According to the process the conditions can be adjusted to achieve a ratio well in excess of 700:1. The resulting mixed sulphide precipitate may have a relatively high, e.g., 8:1 or more, nickel to cobalt ratio but this is not a problem since this precipitate is recycled to the first and second-mentioned cobalt removal stages where replacement of nickel with cobalt in the mixed sulphide precipitate occurs. The Ni/Co ratio of the final mixed nickel-cobalt sulphide precipitate from the second-mentioned cobalt removal stage may be controlled at a low level through control of the quantity of sulphidizing agent used in that stage.

The process of this invention is described in detail below with reference to the accompanying drawings in which.

The process described herein may be employed in conjunction with any overall process for recovering nickel and cobalt from source materials by leaching with ammoniacal ammonium salt solutions. However, the invention is particularly well adapted for use in conjunction with processes for recovering nickel and cobalt from lateritic and garnieritic ores by reduction roasting and ammonium carbonate leaching. Such processes are described in detail in a number of publications, including Canadian Pat. Nos. 811,078 and 811,079.

According to the process, the ore is dried to reduce the moisture content to below about 5 percent by weight, then ground to substantially 100 percent minus 100 mesh standard Tyler screen. The ore is fed into the top of a multiple-hearth furnace, passes downwardly and counter-currently to hot reducing gases and exits from the bottom. The ore is initially preheated in the furnace to about 500° C. then reduction roasted at a temperature of about 500° to 850° C. During the reduction roasting operation, the nickel and cobalt oxides in the ore reduce to metallic form. The conditions in the furnace are controlled to minimize the amount of iron which reduces to a soluble form.

The reduced ore discharged from the furnace is cooled then treated with an aqueous ammoniacal ammonium carbonate solution to extract the metallic nickel and cobalt values and dissolve them in the leach solution as nickel and cobalt ammine carbonate. The leach operation is usually conducted in two stages. Solution and residue from the first stage leach are separated and the residue is passed to the second stage leach. A portion of the solution decanted from both leach stages is recycled to the leach stage from which the solution is decanted and the remainder is treated with a sulphidizing agent which precipitates a large proportion of cobalt and a lesser proportion of nickel from the solution. The sulphidizing agents include ammonium sulphide, hydrogen sulphide, sodium sulphide and sodium sulfhydrate.

The precipitate which comprises a mixed cobalt-nickel sulphide is separated from solution and the solution is passed to treatment for the recovery of the nickel values.

The present invention departs from the foregoing process by conducting the cobalt removal in two stages and recycling a portion of the mixed sulphide precipitate, freshly precipitated from each cobalt removal stage to the stage from which the precipitate was removed. The residue is effective in reducing dissolved cobalt in the cobaltic state to cobaltous cobalt thereby improving the preferential precipitation of cobalt by the sulphidizing agent. Also, the nickel in the high nickel precipitate is redissolved and replaced by cobalt to yield a precipitate of low nickel to cobalt ratio.

The sulphidizing agent added to the cobalt removal stages may be ammonium sulphide, hydrogen sulphide, sodium sulphide and sodium sulfhydrate.

Figures 1, 3:
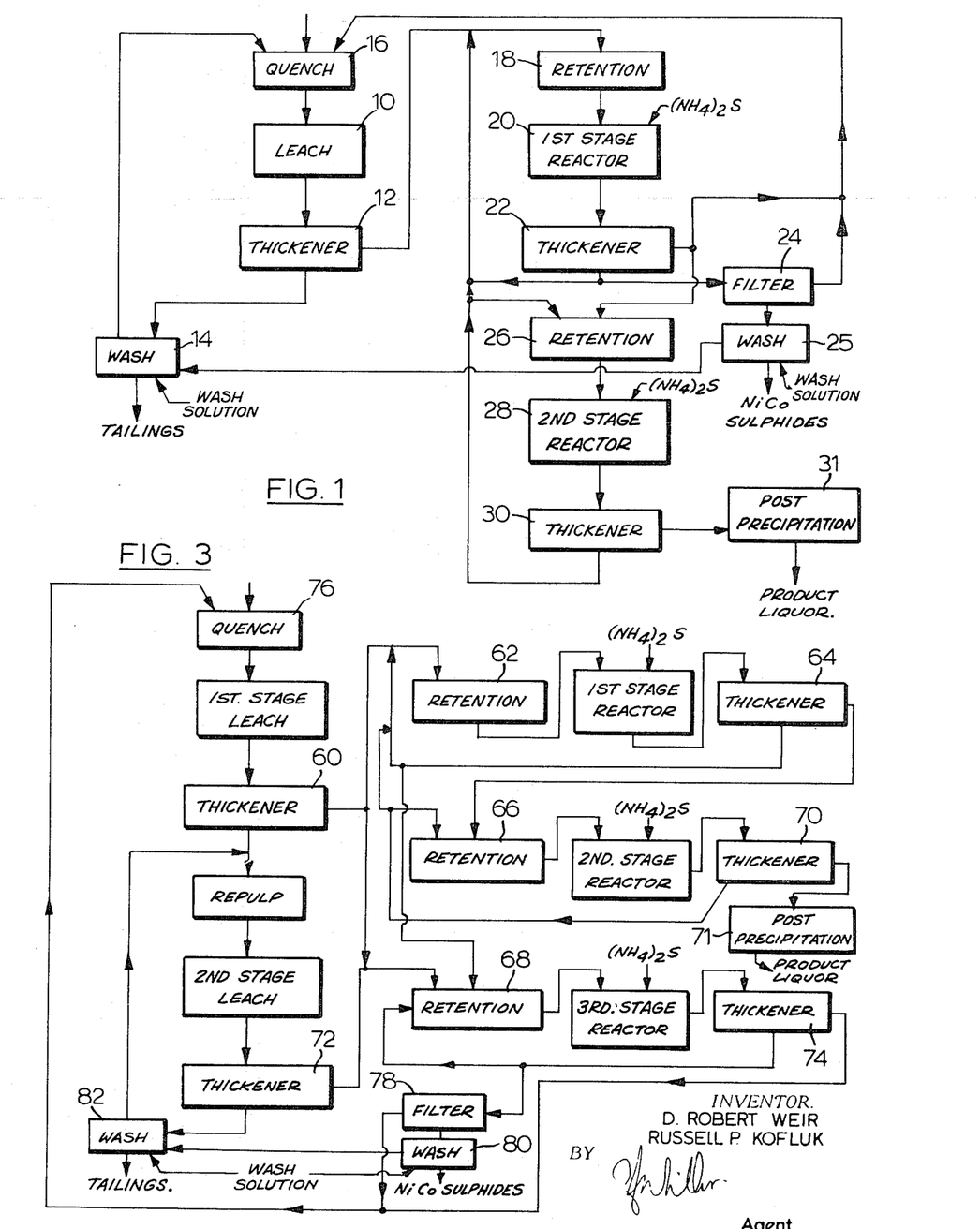
FIGS. 1, 2 and 3 are flow-schemes of three specific processes incorporating the improvement of the present invention.

In the scheme shown in FIG. 1, a single stage leach with two cobalt removal steps is employed. In general this scheme is satisfactory when the nickel content of the ore is relatively high. Solution from leach step 10 is separated from leach residue in thickener 12 and the residue is washed with ammonium carbonate make up solution in washing step 14. The wash solution is recycled to the quenching or leach slurry makeup step 16. The leach solution from thickener 12 is passed to retention cell 18 in which it is stirred thence is passed to first stage reactor 20 where a sulphidizing agent is added. The mixed nickel-cobalt sulphide precipitate is separated from solution in thickener 22 and a portion is recycled to retention cell 18. The remainder is filtered at 24 and solution is recycled to quench 16. The filter is washed with ammoniacal ammonium carbonate solution at washing step 25. It is believed contact of the mixed nickel-cobalt sulphides with the ammoniacal solution at this stage causes a portion of the nickel values to redissolve into solution thereby diminishing the nickel to cobalt ratio of the mixed sulphide product. The washing step 25 is an optional but a preferred operation in the overall flow scheme. Solution from step 25 is recycled to washing step 14.

Part of the overflow from thickener 22 is passed to retention cell 26 of the second cobalt removal stage, and the remainder is passed to quench 16. Material from cell 26 is passed to reactor 28 and a large quantity of sulphidizing agent is added thereto in order to strip out most of the cobalt in solution. Accordingly, the solution in reactor 28 has a high nickel to cobalt ratio. The residue is separated from solution in thickener 30 and a portion is recycled to retention cell 26. The remainder of the sulphide residue is passed to retention cell 18. The solution from thickener 30 is passed to post-precipitation step 31 in which the solution is maintained at a temperature of about 65° to 70° C. for a period of time, generally about 10 minutes. The post-precipitation step results in precipitation of trace sulphides and manganese values both of which may be removed by filtration leaving a product liquor having a high nickel to cobalt ratio. The post-precipitation step is an optional but preferred operation in the flow scheme.

Figure 2:
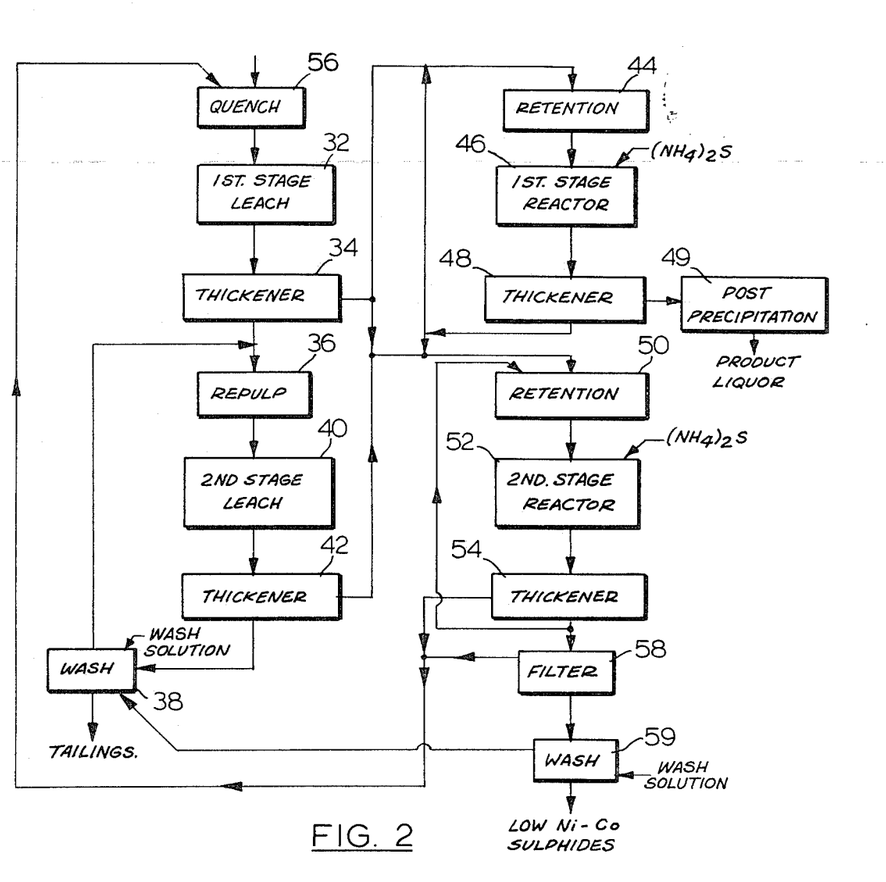

FIG. 2 illustrates a two-stage leach and two-stage cobalt removal operation. Solution and residue from the first stage leach 32 are separated in thickening step 34 and residue is repulped at 36 in solution from washing operation 38. The repulped residue is passed to the second stage leach 40 and residue from the leaching operation is separated from solution in thickening step 42 and passed to washing operation 38. Part of the solution from thickener 34 is passed to retention cell 44 in which it is stirred thence passed to first stage reactor 46 where a sulphidizing agent is added. Solution is separated from the mixed cobalt-nickel sulphide precipitate in thickener 48 and the solution is passed to post-precipitation step 49. A portion of the precipitate is recycled to retention cell 44 and the remainder joins the stream of solution from thickeners 42 and 34 flowing to retention cell 50. The solution is stirred in cell 50 thence is passed into second stage reactor 52 to which sulphidizing agent is added. Residue and solution from reactor 52 are separated in thickener 54 and solution is recycled to quenching step 56. Part of the underflow from thickener 54 is recycled to cell 50 and the remainder is filtered at 58. Solution from step 58 is recycled to quench 56. The filter cake is washed with ammoniacal ammonium carbonate solution in washing step 59 and the residue forms the mixed sulphide product. Solution from washing step 59 is recycled to wash 38.

The filtrate from post-precipitation step 49 forms the product liquor of high nickel to cobalt ratio and a mixed sulphide precipitate having a low nickel to cobalt ratio is obtained from washing step 59.

The conditions in the first stage reactor 46 are adjusted so that the product liquor has the required nickel to cobalt ratio (generally in the order of 700:1 or higher) and the conditions in the second stage reactor 52 adjusted so that the mixed sulphides product has a low nickel to cobalt ratio (generally in the order of 2:1 or less).

To obtain a product liquor having a high nickel to cobalt ratio in the first stage reactor, sufficient sulphidizing agent and recycled mixed sulphide precipitate must be provided in the reactor to precipitate substantially all cobalt in solution as a sulphide. Sulphidizing agent must be provided in the solution in a quantity sufficient to yield a sulphide to cobalt molar ratio usually between about 3.0 to about 10.0 or even higher. In solutions to which the mixed sulphide precipitate is recycled, sufficient amount of the precipitate must be recycled to ensure substantially complete reduction of trivalent cobalt to the cobaltous state.

Where the conditions in the first stage reactor 46 are so adjusted, a significant proportion of the dissolved nickel will co-precipitate with the cobalt. The mixed sulphide precipitate has a nickel to cobalt ratio considerably higher than derived in the nickel cobalt sulphides. The nickel value in the precipitate is not however permanently lost to the product liquor.

Nickel in the portion of the precipitate recycled to the first stage reactor is replaced by cobalt and the nickel redissolves into solution. Nickel in the portion of the precipitate passed to the second stage reactor is also replaced by cobalt and the dissolved nickel is separated from precipitate in thickener 54 and passes to quench 56. Ultimately, the redissolved nickel joins the product liquor in reactor 46.

In order to obtain a mixed sulphide precipitate having a low nickel to cobalt ratio from the underflow from thickener 54, the conditions in the second stage reactor 52 must be adjusted to precipitate the cobalt values in solution while suppressing the co-precipitation of nickel values. Accordingly, the amount of sulphidizing agent introduced into reactor 52 must be severely restricted. The specific amount of sulphidizing agent introduced into the reactor will depend on operational conditions and other factors but in general the sulphide to cobalt molar ratio used in the reactor must be less than 3.0, preferably as close to zero as possible consistent with the amount of cobalt which it is desired to remove.

The amount of mixed sulphide precipitate passing from thickener 48 into retention cell 50 need not be restricted as the sulphide value in the precipitate is bound to contain cobalt and nickel and will not act to precipitate nickel from the solution in reactor 52.

It should be noted that the nickel-cobalt ratio of the mixed sulphide product from the second stage cobalt removal circuit depends upon the cobalt content of the material treated in the first stage leach 32 as well as the cobalt content of the product liquor. As the nickel-cobalt ratio of the mixed sulphides decreases, the cobalt content in the first stage leach 32 and the first stage reactor 46 increases proportionately. In order to obtain a product liquor having a high nickel: cobalt ratio, a large excess of sulphidizing agent must be added to the first stage reactor but in so doing the nickel: cobalt ratio produced in the second stage reactor 52 of the mixed sulphides will be increased. However, by careful control of the cobalt content of the streams running to both first and second stage reactors and from thickener 54 to quench 56, a mixed sulphide of required nickel: cobalt ratio can be obtained. Where for example the quantity of sulphidizing agent added to second stage reactor 52 is severely limited, the streams of liquid passing from thickener 54 to quench 56 will have a relatively high cobalt content thereby increasing the cobalt concentration in the first stage leach 32. As a result the nickel: cobalt content of the mixed sulphide precipitate will decrease Similarly the amount of high cobalt sulphides recycled to the first stage reactor can be increased to achieve the same result.

The process depicted in FIG. 3 is the same as that illustrated in FIG. 2 except that the two stage cobalt removal scheme illustrated in FIG. 1 is substituted for the first cobalt removal operation of FIG. 2. In general this scheme is satisfactory when the nickel to cobalt ratio of the ore is relatively low. This process has the advantage of a greater number of streams of solution than the schemes illustrated in FIGS. 1 and 2. Thus there is greater flexibility in the ways in which the cobalt concentrations in the leach solutions and cobalt removal reactors can be adjusted in order to achieve product liquor and precipitate of a desired nickel to cobalt ratio.

According to the process of FIG. 3, the overflow from first stage thickener 60 is passed to retention cell 62 of the initial cobalt removal stage. The overflow from the thickener 64 of the initial cobalt removal state is passed to the intermediate stage retention cell 66 and the underflow from thickener 64 is passed partly to final stage retention cell 68 and the remainder is recycled to cell 62. The overflow from the intermediate stage thickener 70 is passed to post-precipitation step 71 and the solution therefrom forms the product liquor. A portion of the underflow from thickener 70 is passed to cell 62 and the balance is recycled to cell 66.

Feed to final stage cell 68 includes the overflow from the second leach stage thickener 72 as well as part of the overflow from thickener 60 and underflow from initial cobalt removal thickener 64. The overflow from final cobalt removal thickener 74 is passed to quench 76. The underflow is passed to filter 78 and the solution is passed to quench 76. The cake is washed at 80 and the washed residue forms the mixed sulphide produce. The wash liquor is passed to leach residue wash 82.

EXAMPLE

This example illustrates the operation of the two stage cobalt removal process according to the flow scheme illustrated in FIG. 2. Where reference numerals are used, the operation or element designated by the reference numeral performs or serves the same operation as the operation or element designated by the same numeral.

The ore fed to quench step 56 was a reduced nickeliferous laterite ore containing in addition to reduced nickel and cobalt, copper, iron, sulphur, aluminum, magnesium, manganese and chromium values. The first stage leach solution from thickener 34 containing (gm/l) 12.7–Ni, 0.293–CoT (total cobalt being made up to 0.028 gm/l $Co^{++}$ and 0.265 gm/l $Co^{+++}$) 112–$NH_3$ and 50.7–$CO_2$ was fed at the rate of 37.5 ml/min through three series-connected retention cells 44. Magnetic stirrers in each cell kept the solution continuously in motion.

From the last retention cell the solution was fed at the rate of 40.95 mls/min to a first stage pipe-line reactor (a pigtail condenser) 46 maintained at a temperature of 30° C. $(NH_4)_2S$ was injected at the rate of 0.80 ml/min into the reactor at the point of entry of the solution from the retention cell 44 and additional $(NH_4)_2S$ was injected at the rate of 0.80 ml/min into the reactor at the point of entry of the solution from the retention cell 44 and additional $(NH_4)_2S$ was injected at the rate of 0.20 ml/min at the end of the pipe-line. From the reactor the solution was passed to a retention cell in which sufficient time was allowed to convert dissolved cobalt to a sulphide form. The solution was then passed to a 1,000 ml thickener 48.

Underflow from thickener 48 was withdrawn at the rate of 6.90 ml/min and one-half was recycled to retention cell 44. The remainder of the thickener underflow joined the stream of solution flowing from the second stage leach thickener 42 to retention cell 50. Overflow from the thickener 48 forms the substantially cobalt-free product liquor.

Second stage leach solution from thickener 42 containing (gm/l) 9.84–Ni, 0.294–CoT (0.021 $Co^{++}$ and 0.273 $Co^{+++}$) 105–$NH_3$ and 46.9 $CO_2$ together with the portion of underflow described above from thickener 48 was fed at the rate of 190 ml/min to two series-connected cells 50. The retention time in the cells was 10.8 mins. Solution from the cells was discharged into a second stage pipe-line reactor 52. 1.56 ml/min $(NH_4)_2S$ was injected into the reactor at the point of entry of the solution and 0.2 ml/min was injected at the end of the pipe-line for the first four hours of operation of the scheme. From the fourth to sixth hours, the rate of injection of $(NH_4)_2S$ was increased to 2.00 mls/min at the point of entry and 0.41 mls/min at the end of the pipe-line. The liquid and solid discharged from the reactor was passed to a 550 ml cell and retained therein for 13.6 min. The material was then passed to a 6,000 ml thickener 54. Overflow from the thickener was recycled to quench 56 and the underflow was filtered at 58 and the residue was washed with ammonium carbonate. The washed solids formed the product mixed sulphides.

Samples were taken at hourly intervals of the overflow from the first stage thickener 48 (designated A) and overflow (B) and underflow (C) from the second stage thickener 54. An analysis of these samples are tabulated below.

| Sample No. | Time | Solution Ni | Solution Co | Ni:Co ratio | Mixed sulphide Ni:Co ratio | S=:Co ratio |
|---|---|---|---|---|---|---|
| 1-A | Hr. #1 | 11.83 | 0.0051 | 2320:1 | 8.90:1 | 6.95:1 |
| 2-B |  | 10.51 | 0.153 | 68.8:1 | 2.92:1 | 2.41:1 |
| 3-C |  | 10.51 | 0.149 | 70.5:1 | 0.785:1 | 2.41:1 |
| 4-A | Hr. #2 | 11.44 | 0.0030 | 3820:1 | 12.7:1 | 6.95:1 |
| 5-B |  | 9.81 | 0.117 | 83.8:1 | 2.80:1 | 2.41:1 |
| 6-C |  | 9.66 | 0.125 | 77.3:1 | 0.845:1 | 2.41:1 |
| 7-A | Hr. #3 | 11.18 | 0.0036 | 3100:1 | 18.2:1 | 6.95:1 |
| 8-B |  | 10.01 | 0.121 | 82.8:1 | 3.13:1 | 2.41:1 |
| 9-C |  | 9.72 | 0.117 | 83.0:1 | 0.652:1 | 2.41:1 |
| 10-A | Hr. #4 | 11.39 | 0.0020 | 5690:1 | 24.3:1 | 6.95:1 |
| 11-B |  | 9.77 | 0.115 | 85.0:1 | 2.34:1 | 2.41:1 |
| 12-C |  | 9.79 | 0.102 | 96.0:1 | 0.647:1 | 2.41:1 |
| 13-A | Hr. #5 | 11.51 | 0.0029 | 3970:1 | 14.0:1 | 6.95:1 |
| 14-B |  | 9.89 | 0.080 | 123:1 | 3.73:1 | 3.30:1 |
| 15-C |  | 10.46 | 0.067 | 131:1 | 0.625:1 | 3.30:1 |
| 16-A | Hr. #6 | 11.38 | 0.0038 | 3000:1 | 11.9:1 | 6.95:1 |
| 17-B |  | 9.58 | 0.070 | 137:1 | 4.26:1 | 3.30:1 |
| 18-C |  | 9.68 | 0.043 | 225:1 | 0.687:1 | 3.30:1 |

The results demonstrates that by recycling mixed cobalt-nickel sulphides in a two stage sulphidizing operation, cobalt can be stripped to a very low level from the product liquor and a mixed sulphide precipitate can be obtained having a low Ni:Co ratio.

The Ni:Co ratio in the product liquor (solution from overflow A) after 1 hour was 2320:1 and increased to 5690:1 after 3 hours. When the slurry is retained for a period of time after passage through reactor 46, the sulphidizing reaction will proceed to completion. The overflow from thickener 48 is very clear and is not susceptible to post-precipitation. The Ni:Co ratio in the mixed sulphide precipitate (precipitate from underflow C) was less than one in every instance and well below the highest desirable ratio of 2:1. The sulphides in the thickener overflow (B) represent less than 0.5 percent of the total quantity of sulphide precipitate.

It will be understood, of course, that modifications can be made in the preferred embodiments of the present invention as described hereinabove without departing from the scope and purview of the appended claims.

What we claim as new and desire to protect by Letters Patent of the United States is:

1. In a process for treating nickel and cobalt bearing material in which the material is subjected to a leaching operation in which it is leached in one or more stages under oxidizing conditions with an ammonium salt leach solution in order to cause dissolution of nickel and cobalt values contained in said material after which said nickel and cobalt containing leach solution is separated from undissolved residue and said separated solution is subjected to a cobalt removal operation in which said separated solution is treated with a sulphidizing agent to preferentially precipitate cobalt values therefrom so as to provide a product liquor and a product precipitate composed of a mixed nickel-cobalt sulphide, said product liquor containing the bulk of the nickel values previously in said nickel and cobalt containing in which it is leached in at least two stages under oxidizing conditions with an ammonium salt leach solution in order to cause dissolution of nickel and cobalt values contained in said material after which said nickel and cobalt containing leach solution from each said leaching stage is separated from undissolved residue and said separated solution from each said leaching stage is subjected to a cobalt removal operation in which said separated solu-tion is treated with a sulphidizing agent to preferentially precipitate cobalt values therefrom so as to provide a product liquor and a product precipitate composed of a mixed nickel-cobalt sulphide, said product liquor containing the bulk of the nickel values previously in said nickel and cobalt containing leach solution together with a small residual quantity of cobalt, said product precipitate containing the bulk of the cobalt values previously in said nickel and cobalt containing leach solution together with a quantity of co-precipitated nickel, the improvement to said cobalt-removal operation whereby the nickel-cobalt ratio in said product liquor is adjusted to a value above about 700:1 concurrently with an adjustment of the nickel-cobalt ratio in said product precipitate to a value below about 2:1, said improvement comprising the steps of: passing nickel and cobalt containing solution separated from one said leaching stage to a first cobalt-removal stage to which is added sulphidizing agent in controlled amount such that the ratio of nickel to cobalt remaining in solution following formation of a mixed nickel-cobalt sulphide precipitate therein is above about 700:1, removing solution from said first cobalt-removal stage and recovery thereof as said product liquor for subsequent treatment for recovery of nickel therefrom, removing from said first cobalt-removal stage the mixed nickel-cobalt sulphide precipitate formed therein and recycling at least a portion thereof to said first leach solution together with a small residual quantity of cobalt, said product precipitate containing the bulk of the cobalt values previously in said nickel and cobalt containing leach solution together with a quantity of co-precipitated nickel, the improvement to said cobalt-removal operation whereby the nickel-cobalt ratio in said product liquor is adjusted to a value above about 700:1 concurrently with an adjustment of the nickel-cobalt ratio in said product precipitate to a value below about 2:1, said improvement comprising the steps of: passing said separated nickel and cobalt containing leach solution to a first cobalt-removal stage to which is added sulphidizing agent in controlled amount such as to cause formation of a mixed nickel-cobalt sulphide precipitate having a nickel-cobalt ratio of less than about 2:1, removing from said first cobalt removal stage the mixed nickel-cobalt sulphide precipitate formed therein and recycling a portion thereof to said first cobalt removal stage and recovering the remainder thereof as said product precipitate, removing solution from said first cobalt-removal stage and recycling a portion thereof to said leaching operation and passing the remainder thereof to a second cobalt removal stage to which is added sulphidizing agent in controlled amount such that the ratio of nickel to cobalt remaining in solution following formation of a mixed nickel-cobalt sulphide precipitate therein is above about 700:1, removing solution from said second cobalt-removal stage and recovery thereof as said product liquor for subsequent treatment for recovery of nickel therefrom, removing from said second cobalt-removal stage the mixed nickel-cobalt sulphide precipitate formed therein and recycling at least a portion thereof to said second cobalt-removal stage and adding any unrecycled portion thereof to said first cobalt-removal stage.

2. The process as claimed in claim 1, wherein said product liquor is maintained at a temperature of about 65° to 75° C. for a time sufficient to precipitate contained sulphides and any manganese thence said precipitated sulphides and any manganese are separated from solution.

3. The process as claimed in claim 1, wherein said mixed nickel-cobalt sulphide product is washed with ammonium carbonate and the wash solution is recycled to the leaching operation.

4. In a process for treating nickel and cobalt bearing material in which the material is subjected to a leaching operation cobalt-removal stage and adding any unrecycled portion thereof to a second cobalt-removal stage, passing nickel and cobalt containing solution separated from another said leaching stage to said second cobalt-removal stage to which is added sulphidizing agent in controlled amount such as to cause formation of a mixed nickel-cobalt sulphide precipitate having a nickel-cobalt ratio of less than about 2:1, removing from said second cobalt-removal stage the mixed nickel cobalt sulphide precipitate formed therein and recycling a portion thereof to said second cobalt-removal stage and recovering the remainder thereof as said product precipitate, removing solution from said second cobalt-removal stage and recycling thereof to said leaching operation.

5. In a process for treating nickel and cobalt bearing material in which the material is subjected to a leaching operation in which it is leached in at least two stages under oxidizing conditions with an ammonium salt leach solution in order to cause dissolution of nickel and cobalt values contained in said material after which said nickel and cobalt containing leach solution from each said leaching stage is separated from undissolved residue and said separated solution from each said leaching stage is subjected to a cobalt-removal operation in which said separated solution is treated with a sulphidizing agent to preferentially precipitate cobalt values therefrom so as to provide a product liquor and a product precipitate composed of a mixed nickel-cobalt sulphide, said product liquor containing the bulk of the nickel values previously in said nickel and cobalt containing leach solution together with a small residual quantity of cobalt, said product precipitate containing the bulk of the cobalt values previously in said nickel and cobalt containing leach solution together with a quantity of co-precipitated nickel, the improvement to said cobalt-removal operation whereby the nickel-cobalt ratio in said product liquor is adjusted to a value above about 700:1 concurrently with an adjustment of the nickel-cobalt ratio in said product precipitate to a value below about 2:1, said improvement comprising the steps of: passing nickel and cobalt containing solution separated from one said leaching stage to a first cobalt-removal stage to which is added sulphidizing agent to cause formation of a mixed nickel-cobalt sulphide precipitate therein, removing from said first cobalt-removal stage the mixed nickel-cobalt sulphide precipitate formed therein and recycling at least a portion thereof to said first cobalt-removal stage and adding any unrecycled portion thereof to a third cobalt-removal stage, passing solution removed from said first removal state to a second cobalt-removal stage to which is added sulphidizing agent in controlled amount such that the ratio of nickel to cobalt remaining in solution following formation of a mixed nickel-cobalt sulphide precipitate therein is above about 700:1, removing solution from said second cobalt-removal stage and recovery thereof as said product liquor for subsequent treatment for recovery of nickel therefrom, removing from said second cobalt-removal stage the mixed nickel-cobalt sulphide precipitate formed therein and recycling at least a portion thereof to said second cobalt-removal stage and adding any unrecycled portion thereof to said first cobalt-removal stage, passing nickel and cobalt containing solution separated from another said leaching stage to said third cobalt-removal stage to which is added sulphidizing agent in controlled amount such as to cause formation of a mixed nickel-cobalt sulphide precipitate having a nickel-cobalt ratio of less than about 2:1, removing from said third cobalt-removal stage the mixed nickel-cobalt sulphide precipitate formed therein and recycling a portion thereof to said third cobalt-removal stage and recovering the remainder thereof as said product precipitate, removing solution from said third cobalt-removal stage and recycling thereof to said leaching operation.

6. The process as claimed in claim 4 wherein said product liquor is maintained at a temperature of about 65° to 75° C. for a time sufficient to precipitate contained sulphides and any manganese thence said precipitated sulphides and any manganese are separated from solution.

7. The process as claimed in claim 5 wherein said product liquor is maintained at a temperature of about 65° to 75° C. for a time sufficient to precipitate contained sulphides and any manganese thence said precipitated sulphides and any manganese are separated from solution.

* * * * *

UNITED STATES PATENT OFFICE
CERTIFICATE OF CORRECTION

Patent No. 3,716,618　　　　Dated February 13, 1973

Inventor(s) DONALD ROBERT WEIR, ET. AL.

It is certified that error appears in the above-identified patent and that said Letters Patent are hereby corrected as shown below:

Columns 8 and 9, claim 1 should read as follows:

-- 1. In a process for treating nickel and cobalt bearing material in which the material is subjected to a leaching operation in which it is leached in one or more stages under oxidizing conditions with an ammonium salt leach solution in order to cause dissolution of nickel and cobalt values contained in said material after which said nickel and cobalt containing leach solution is separated from undissolved residue and said separated solution is subjected to a cobalt removal operation in which said separated solution is treated with a sulphidizing agent to preferentially precipitate cobalt values therefrom so as to provide a product liquor and a product precipitate composed of a mixed nickel-cobalt sulphide, said product liquor containing the bulk of the nickel values previously in said nickel and cobalt containing leach solution together with a small residual quantity of cobalt, said product precipitate containing the bulk of the cobalt values previously in said nickel and cobalt containing leach solution together with a quantity of co-precipitated nickel, the improvement to said cobalt-removal operation whereby the nickel-cobalt ratio in said product liquor is adjusted to a value above about 700:1 concurrently with an adjustment of the nickel-cobalt ratio in said product precipitate to a value below about 2:1, said improvement comprising the steps of: passing said separated nickel and cobalt containing leach solution to a first cobalt-removal stage to which is added sulphidizing agent in controlled amount such as to cause formation of a mixed nickel-cobalt sulphide precipitate having a nickel-cobalt ratio of less than about 2:1, removing from said first cobalt removal stage the mixed nickel-cobalt sulphide precipitate formed therein and recycling a portion thereof to said first cobalt removal stage and recovering
the remainder thereof as said product precipitate,
removing solution from said first cobalt-removal stage
and recycling a portion thereof to said leaching operation
and passing the remainder thereof to a second cobalt
removal stage to which is added sulphidizing agent in con-
trolled amount such that the ratio of nickel to cobalt
remaining in solution following formation of a mixed nickel-
cobalt sulphide precipitate therein is above about 700:1,
removing solution from said second cobalt-removal stage
and recovery thereof as said product liquor for subsequent
treatment for recovery of nickel therefrom, removing from
said second cobalt-removal stage the mixed nickel-cobalt
sulphide precipitate formed therein and recycling at least
a portion thereof to said second cobalt-removal stage and
adding any unrecycled portion thereof to said first cobalt-
removal stage. -- .

Column 10, cancel claim 4 and substitute the following:

-- 4. In a process for treating nickel and cobalt bearing
material in which the material is subjected to a leaching
operation in which it is leached in at least two stages under
oxidizing conditions with an ammonium salt leach solution in
order to cause dissolution of nickel and cobalt values
contained in said material after which said nickel and cobalt
containing leach solution from each said leaching stage is
separated from undissolved residue and said separated
solution from each said leaching stage is subjected to a
cobalt removal operation in which said separated solution
is treated with a sulphidizing agent to preferentially
precipitate cobalt values therefrom so as to provide a
product liquor and a product precipitate composed of a mixed
nickel-cobalt sulphide, said product liquor containing the
bulk of the nickel values previously in said nickel and cobalt
containing leach solution together with a small residual
quantity of cobalt, said product precipitate containing
the bulk of the cobalt values previously in said nickel
and cobalt containing leach solution together with a quantity
of co-precipitated nickel, the improvement to said cobalt-
removal operation whereby the nickel-cobalt ratio in said pro-
duct liquor is adjusted to a value above about 700:1
concurrently with an adjustment of the nickel-cobalt ratio
in said product precipitate to a value below about 2:1, said
improvement comprising the steps of: passing nickel and
cobalt containing solution separated from one said leaching
stage to a first cobalt-removal stage to which is added
sulphidizing agent in controlled amount such that the ratio of nickel to cobalt remaining in solution following formation of a mixed nickel-cobalt sulphide precipitate therein is above about 700:1, removing solution from said first cobalt-removal stage and recovery thereof as said product liquor for subsequent treatment for recovery of nickel therefrom, removing from said first cobalt-removal stage the mixed nickel-cobalt sulphide precipitate formed therein and recycling at least a portion thereof to said first cobalt-removal stage and adding any unrecycled portion thereof to a second cobalt-removal stage, passing nickel and cobalt containing solution separated from another said leaching stage to said second cobalt-removal stage to which is added sulphidizing agent in controlled amount such as to cause formation of a mixed nickel-cobalt sulphide precipitate having a nickel-cobalt ratio of less than about 2:1, removing from said second cobalt-removal stage the mixed nickel cobalt sulphide precipitate formed therein and recycling a portion thereof to said second cobalt-removal stage and recovering the remainder thereof as said product precipitate, removing solution from said second cobalt-removal stage and recycling thereof to said leaching operation. -- .

Signed and sealed this 20th day of November 1973.

(SEAL)
Attest:

EDWARD M. FLETCHER, JR.
Attesting Officer

RENE D. TEGTMEYER
Acting Commissioner of Patents